United States Patent
Goetheer et al.

(10) Patent No.: US 12,195,865 B2
(45) Date of Patent: Jan. 14, 2025

(54) METHOD FOR ELECTROCHEMICAL PRODUCTION OF A PRODUCT IN A CELL COMPRISING A POLYELECTROLYTE

(71) Applicant: Nederlandse Organisatie Voor Toegepast-Natuurwetenschappelijk Onderzoek TNO, s-Gravenhage (NL)

(72) Inventors: Earl Lawrence Vincent Goetheer, Mol (BE); Roman Latsuzbaia, Delft (NL); Elena Pérez Gallent, Leiden (NL); Cornelis Petrus Marcus Roelands, Voorschoten (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 18/001,730

(22) PCT Filed: Jun. 18, 2021

(86) PCT No.: PCT/NL2021/050385
§ 371 (c)(1),
(2) Date: Dec. 14, 2022

(87) PCT Pub. No.: WO2021/256931
PCT Pub. Date: Dec. 23, 2021

(65) Prior Publication Data
US 2023/0235465 A1 Jul. 27, 2023

(30) Foreign Application Priority Data
Jun. 19, 2020 (EP) .................................... 20181217

(51) Int. Cl.
*C25B 9/21* (2021.01)
*C25B 1/30* (2006.01)
(Continued)

(52) U.S. Cl.
CPC .................. *C25B 9/21* (2021.01); *C25B 1/30* (2013.01); *C25B 3/07* (2021.01); *C25B 9/23* (2021.01); *C25B 15/08* (2013.01); *C25B 3/26* (2021.01)

(58) Field of Classification Search
None
See application file for complete search history.

(56) References Cited

U.S. PATENT DOCUMENTS

| 2,978,394 A | 4/1961 | Moyer |
| 6,254,762 B1 | 7/2001 | Uno et al. |
| (Continued) | | |

FOREIGN PATENT DOCUMENTS

| WO | 2015034354 A1 | 3/2015 |
| WO | 2017222382 A1 | 12/2017 |
| WO | 2019172750 A1 | 9/2019 |

OTHER PUBLICATIONS

Mehmood et al. (Electrochimica Acta 219 '2016' 655-663) (Year: 2016).*

(Continued)

*Primary Examiner* — Wojciech Haske
(74) *Attorney, Agent, or Firm* — Banner & Witcoff, Ltd.

(57) ABSTRACT

The invention relates to a method for electrochemical production of a product in an electrochemical cell comprising an extraction compartment. The extraction compartment comprises a liquid comprising a dissolved polyelectrolyte. The method comprises producing cations at an anode, producing anions at a cathode and transporting the ions through ion-selective membranes into the extraction compartment where the product is formed. The invention further relates to an electrochemical cell for use in the method.

17 Claims, 9 Drawing Sheets

(51) Int. Cl.
*C25B 3/07* (2021.01)
*C25B 9/23* (2021.01)
*C25B 15/08* (2006.01)
*C25B 3/26* (2021.01)

(56) References Cited

U.S. PATENT DOCUMENTS

| | | |
|---|---|---|
| 10,047,446 B2 | 8/2018 | Kaczur et al. |
| 2017/0037522 A1 | 2/2017 | Kaczur et al. |
| 2019/0010620 A1 | 1/2019 | Kaczur et al. |
| 2020/0080211 A1 | 3/2020 | Schmid et al. |

OTHER PUBLICATIONS

Yang et al. "Elucidation of the Mechanism of Dioxygen Reduction on Metal-Free Carbon Electrodes", J. Electro. Chem. Soc. 147 (2000), 3420.

Shen et al. "Polyelectrolyte-functionalized ionic liquid for electrochemistry in supporting electrolyte free aqueous solutions and application in amperometric flow injection analysis", Green Chemistry, 2007, 9, 746-753.

Schille et al. "On the Use of Polyelectrolytes and Polymediators in Organic Electrosynthesis" Angew. Chem. Int. Ed. 2018, 57, 422-426.

Roesel et al. "Iodophenylsulfonates and Iodobenzoates as Redox-Active Supporting Electrolytes for Electrosynthesis", ChemElectroChem / vol. 6, Issue 16 / p. 4229-4237.

Robinson et al. "Polyelectrolyte-Mediated Electrochemical Fabrication of a Polyacetylene p-n Junction", Chem. Mater. 2010, 22, 1, 241-246.

Maki et al. "Transitions from simple electrolyte to polyelectrolyte in a series of polyphosphates", Colloids and Surfaces A: Physicochemical and Engineering Aspects, vol. 484, Nov. 5, 2015, pp. 153-163.

Gill et al. "Ion Exchange Kinetics of Polyelectrolytes Under Steady-State Electrolysis Across A Porous Frit", J. Phys. Chem. 1962, 66, 6, 995-999.

Conway et al., Comprehensive Treatise of electrochemistry vol. 7. (1983).

* cited by examiner

METHOD FOR ELECTROCHEMICAL PRODUCTION OF A PRODUCT IN A CELL COMPRISING A POLYELECTROLYTE

RELATED APPLICATIONS

This application is a National Stage Application under 35 U.S.C. 371 of co-pending PCT application PCT/NL2021/050385 designating the United States and filed Jun. 18, 2021; which claims the benefit of EP application number 20181217.9 and filed Jun. 19, 2020, each of which are hereby incorporated by reference in their entireties.

The invention is in the field of electrochemistry and in particular in the field of electrochemical cells. More particular, the invention is related to a method for electrochemical production of a product in an electrochemical cell comprising a polyelectrolyte. The invention further relates to an electrochemical cell for use in the method.

Electrochemical cells include devices that may use electrical energy to carry out chemical reactions or may generate electrical energy from chemical reactions. These cells typically comprise at least an anode, a cathode, an electrolyte (e.g. comprising a solvent and an electrolyte solute) and optionally one or more membranes separating the anode and the cathode. Suitable membranes include ion-selective membrane such as a cation exchange membranes (CEM), an anion exchange membranes (AEM) and a bipolar membranes (BPM).

When an electrochemical cell is operated to carry out chemical reactions by using electrical energy, an oxidation reaction occurs at the anode and a reduction reaction at the cathode, where half-reaction products such as cations and anions are respectively formed. One or more of these half-reaction products or combinations thereof are typically the product or desired compound which is aimed for in the process.

Particular electrochemical reaction processes, e.g. the production of $H_2O_2$, glycolic acid, oxalic acid and formic acid, may advantageously be carried out in electrochemical cells comprising an extraction compartment. The extraction compartment is generally a compartment in an electrochemical cell that is separated from the anode and cathode by ion-selective membranes. By selecting these membranes such that they are permeable to the half-reaction products or the product, the compartment enables a continuous, quick and facile extraction of the product from the cell. This is particularly favorable if the product is unstable under the conditions it is produced at in the cell, e.g. in the anode or cathode compartment. Additionally, having such a configuration may have further advantages. For instance, when a carboxylic acid is produced in a basic environment (e.g. in the cathode compartment) the product is typically in the form of a salt. On the contrary, if the product is formed in a more acidic environment (e.g. an extraction compartment) the product is typically protonated. A protonated product may allow for easier separation by for instance precipitation. Moreover, it typically eliminates the need to acidify the electrolytes for product separation and minimizes the generation of waste streams. Furthermore, as the products in a three-compartment cell may continuously be extracted, there is limited to no need to recycle the electrolytes in contrast to conventional two-compartment cells.

For example, a three-compartment cell is disclosed in e.g. WO2017/222382 for the production of $H_2O_2$. In the three-compartment cell described therein, the produced ions $HOO^-$ and $H^+$ are transported through ion-selective membranes into an extraction compartment of the electrochemical cell comprising a solid ion-conductive material. The product $H_2O_2$ can be isolated from the cell by a liquid flowing through the extraction compartment.

In US 2017/037522, a three-compartment cell comprising an anode compartment, a center flow compartment and a cathode compartment is disclosed for the production of the product formic acid from $CO_2$. It is described that the center flow compartment may contain a solid ion-conductive fill material. Such ion-conductive fill material can for instance be conductive resin beads.

WO2019/172750 discloses the use of a three-compartment electrochemical cell for in-situ extraction of organic carboxylic acids. The product compartment may comprise an aqueous phase with ion-exchange fillers.

Although the electrochemical cells comprising an extraction compartment are suitable for small-scale processes, a drawback of the solid-ion exchange materials as described in US 2017/037522 and WO2017/222382 is that the solid materials do not flow with the liquid but form a static barrier that creates the need for additional pressure to ensure flow of the liquid through the middle extraction compartment. Thus, the solid material is associated with a pressure drop when the liquid passes through the extraction compartment. Although, the pressure drop can be reduced by increasing the cross-sectional surface area of the extraction compartment perpendicular to the flow direction of the flow of the liquid, this concomitantly results in a larger distance between the electrodes that in turn leads to a higher energy consumption of the process. These drawbacks particularly hinder the upscaling of the process.

It is an objective of the present inventors to provide a method for electrochemical production of a product that overcomes at least some of the above-mentioned drawbacks. It has been found that this objective can be met by a method for electrochemical production of a product in an electrochemical cell comprising a dissolved polyelectrolyte in an extraction compartment.

Figure 1:
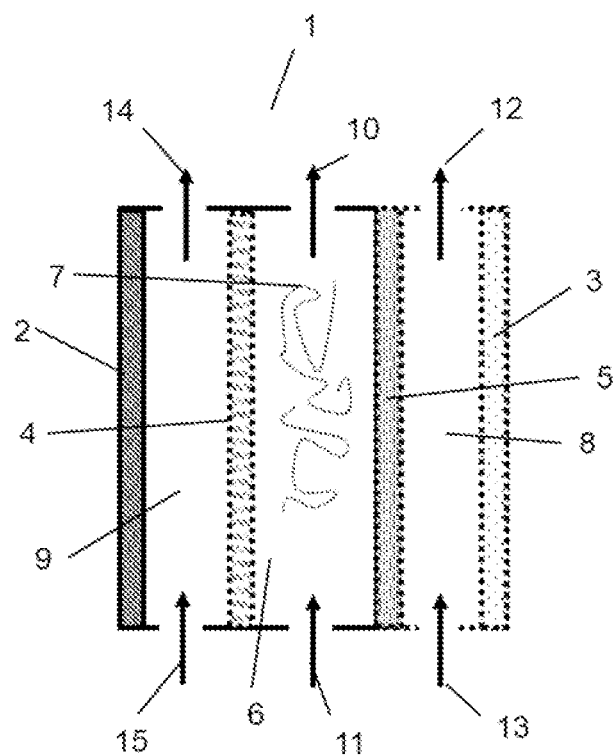
FIG. 1 illustrates an embodiment of the three-compartment electrochemical cell according to the present invention.

In a first aspect, the invention is directed to a method for electrochemical production of a product in an electrochemical cell comprising:

producing cations at an anode;
producing anions at a cathode;
transporting the cations through a cation exchange membrane (CEM) into an extraction compartment of the electrochemical cell;
transporting the anions through an anion exchange membrane (AEM) into the extraction compartment;
combining at least part of the anions and cations in the extraction compartment to form the product. The extraction compartment is provided between the CEM and AEM and comprises a liquid comprising a dissolved polyelectrolyte.

The polyelectrolyte according to the present invention comprises a polymer based on one or more monomers comprising an electrolyte group (e.g. a carboxylate or amine) and which is capable of conducting ions. The present inventors have surprisingly found that the polyelectrolytes, although being ionic and dissolved, do not substantially cross the membranes and can accordingly remain present in the extraction compartment. In other words, the CEM and AEM are accordingly essentially impermeable for the polyelectrolytes, meaning that the electrolyte does not substantially flow to the anode and/or cathode compartments. For the sake of clarity, even if the polyelectrolytes are circulated through the extraction compartment (which may be the case in preferred embodiments), this is still regarded that the polyelectrolyte (overall) remains in the extraction compartment. Moreover, the polyelectrolytes are surprisingly sufficiently ion-conductive such that the energy consumption does not undesirably increase. Furthermore, the polyelectrolytes are particularly stable in the extraction compartment and typically non-reactive towards the formed product.

The liquid in the extraction compartment typically also comprises water, in which case the liquid may be referred to as an aqueous liquid. Additionally or alternatively to water, other solvents (e.g. methanol) may be used as long as this is not detrimental to the solvability of the polyelectrolyte and the product.

Polyelectrolytes are not commonly used in electrochemistry as it is more typical to employ smaller and cheaper electrolyte solutes such as salts (e.g. $K_2SO_4$). Such salts are advantageously very stable, also when being in contact with the anodes. An example of using a salt, for instance as a salt bridge is disclosed in e.g. US2020/0080211. In contrast to salts, when dissolved polyelectrolytes are used in typical electrochemical cells that do not comprise an extraction compartment, problems regarding the solubility and stability of the polyelectrolytes typically arise. Schille et al. (Angew. Chem. Int. Ed. 2018, 57, 422-426) disclose a specific polyelectrolyte for the conversion of alcohols to carbonyl compounds using a single-compartment electrochemical cell. However, disadvantageously, the single compartment disclosed by Schille et al. does not provide the advantages offered by the extraction compartment. Additionally, the half-reaction product from the reaction at the cathode may be oxidized at the anode and the half-reaction product from the reaction at the anode may be reduced at the cathode. Moreover, the polyelectrolyte disclosed by Schille et al. is not particularly suitable for the production of anions such as $HOO^-$ and $HCOO^-$ according to the present process.

The method according to the present invention is preferably suitable for the production of anions which, when combined with a proton, form the desired compound or product. Other cations, for example inorganic cations such as alkali metals or alkaline earth metals (e.g. $Na^+$, $Li^+$, $Ca^{2+}$) may also or alternatively be combined with the anions to form a salt. Examples of anions that can be made are $HO_2^-$ and carboxylate ions ($R-CO_2^-$) such as $HCO_2^-$, which combine with protons to form hydrogen peroxide and carboxylic acids such as glycolic acid, oxalic acid and formic acid. Accordingly the product preferably comprises hydrogen peroxide ($H_2O_2$), a carboxylic acid, and/or a salt thereof. More preferably the product comprises $H_2O_2$, formic acid, and/or a salt thereof.

Formic acid is an industrial chemical that may be used for instance as a preservative in livestock feed, for leather tanning and/or for making other (fine) chemicals. Advantageously, carbon dioxide is used and the general electrochemical process may thus be used as a means towards a carbon-neutral based economy.

Hydrogen peroxide is a versatile chemical that may be used in solutions for disinfection and/or water treatment, as well as for bleaching of pulp, paper and/or textiles. Moreover, hydrogen peroxide is often used in the production of other chemicals. In combination with UV radiation, hydrogen peroxide may also be used to break down organic compounds and thus may be used for removing drugs, drug residues and pesticides from aqueous streams.

The method according to the present invention is particularly suitable for the production of hydrogen peroxide as it may allow for decentralized production and thereby reduces the risks associated with the transport, handling and storage of hydrogen peroxide solutions. Additionally, the electrochemical production of hydrogen peroxide generally does not require hydrogen and can be carried out by using water and air (i.e. oxygen) as starting materials.

The method comprises the production of cations at the anode and the production of anions at the cathode. The anode is preferably stable against corrosion, mechanically stable and has a uniform current distribution. The anode may comprise lead oxide, for instance $PbO_2$, which may be supported on a metal such as lead, or on porous graphite such as activated carbon, carbon nanotubes (CNT), reticulated vitreous carbon (RVC) or carbon felt or a titanium support, or a boron doped diamond (BDD). The anode may be a 2D or 3D structure. Particularly high conversion rates have been achieved by using the preferred porous electrodes, fusion electrodes, mesh electrodes, nanostructured electrodes, metal or metal oxide particles supported on porous carbon/graphite electrodes or a combination thereof. The anode may alternatively or additionally comprise one or more of mixed metal oxide (MMO), dimensionally stable anodes (DSA®), stainless steel, brass-carbon based graphitic electrodes, BDD, Mn, Pt, Au, Ag, Cu, Ir, Ru, Pd, Ni, Co, Zn, Cd, In, Sn, Ti, Fe, alloys and/or oxides thereof. The anode may be a gas diffusion electrode (GDE). A GDE is a porous and conductive electrode that in operation preferably provides a conjunction of a solid, liquid and gaseous phase.

The anions that are produced at the cathode are typically actively moving towards the extraction compartment by the electrical potential that is applied over the anode and the cathode. Vice versa, the cations produced at the anode are generally actively moving toward the extraction compartment.

The cathode comprises preferably a GDE that preferably comprises a catalyst. Particularly suitable catalysts for $H_2O_2$ generation comprise carbon-based catalysts. The efficiency of $H_2O_2$ production may be improved by using oxygen-functionalized carbon materials such as materials comprising functional groups including —COOH, —COC— (see e.g. Lu et al. Nature Catalysis, 2018, 1, 156-162). Typically, GDEs such as carbon-plates, RVC, carbon particles and/or carbon cloth are used. Additionally, these may be doped with various elements (e.g. N-doping, O-doping) to enhance the catalytic activity. Other suitable catalyst materials comprise metals, metal alloys such as noble metal alloys (see e.g. Siahrostami et al. Nature Materials, 2013, 12, 1137-1143), metal oxides, metal complexes, and/or organic compounds, such as tin-nickel, cerium oxide, cobalt (II) phthalocyanine, cobalt, platinum, platinum alloys, alkyl-anthraquinone, catechol-modified chitosan, vanadium, gold, gold alloys or iron (II) phthalocyanine. The catalyst is preferably in the form of small particles, for example with volume average particle size smaller than 5 μm.

Particularly suitable catalysts for carboxylic acid (e.g. formic acid) generation comprise platinum, palladium, rhodium, molybdenum, zirconium, niobium, osmium, gold, silver, titanium, copper, iridium, ruthenium, rhenium, mercury, lead, nickel, cobalt, zinc, cadmium, tin, iron, chromium, manganese, gallium, thallium, indium, antimony bismuth, oxides and/or alloys thereof, mixed metal oxides, dimensionally stable electrode (DSA®), stainless steel, austenitic steel, ferritic steel, duplex steel, martensitic steel, and/or carbon-based. The preferred catalyst to reduce carbon dioxide to formic acid comprises copper, tin, indium, cadmium, bismuth, mercury, gold, palladium, silver, lead, zinc, nickel, oxides and/or alloys thereof, and/or molecular catalysts, such as porphyrins of various metals and/or combinations thereof. The preferred homogenous or metal-complex catalysts to reduce carbon dioxide to formic acid comprises hydrides, halides, and/or phosphines as ligands. The catalyst may be present in the form of nanostructures, such as, nanoparticles and/or nanorods. In addition, the catalyst may be structured as a foam, felt and/or mesh.

The GDE cathode preferably comprises a current collector such as a metal mesh, for example nickel, gold-plated nickel wire mesh or stainless steel wire mesh, or carbon paper or carbon fleece. The current collector is preferably positioned at the gas stream side of the GDE cathode.

Suitable shapes of the electrodes are for example plate, mesh, rod, wire and/or ribbon. Preferably the cathode and/or anode are plate shaped with a relatively small thickness compared to their length and width. They preferably have a plate-like shape that may be flat, curved, rolled or tubular.

Preferably, the cations and/or anions are formed in solution (i.e. anolyte solution and catholyte solution, respectively) such as in an aqueous solution. Each solution is typically confined to the volume between the electrode and the ion-selective membrane. There may accordingly be a separate compartment such as a cathodic and/or anodic compartment. The cathodic and/or anodic compartments may comprise an inlet and outlet for a liquid stream such as for the catholyte and/or anolyte solution, respectively. Accordingly, in an embodiment of the present invention as for instance illustrated in FIG. 1, the electrochemical cell is a three-compartment cell comprising a cathodic compartment, anodic compartment and an extraction compartment.

Figure 2:
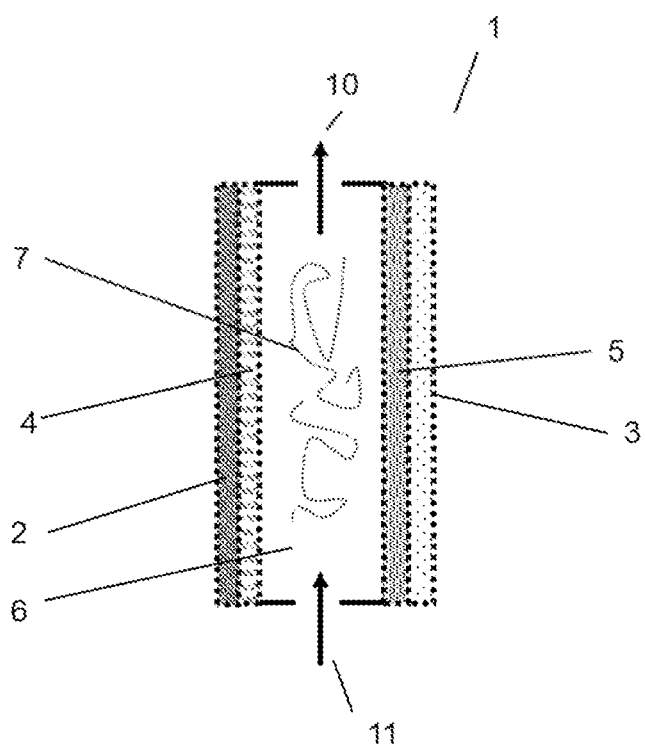
FIG. 2 illustrates an embodiment of a one-compartment electrochemical cell according to the present invention.

Alternatively, a two-compartment or a one-compartment electrochemical cell may be used that comprises a membrane-electrode assembly (MEA). An MEA is an assembly where an electrode is adjoined with the ion-selective membrane. Advantageously, MEA configurations typically reduce the distance between the electrodes and thereby minimize energy consumption. In this case the cathode and/or anode are preferably GDEs. The cathode may be adjoined to the AEM and/or the anode to the CEM. In a one-compartment cell, the cathodic and anodic compartments are typically absent and only the extraction compartment is present. In an MEA-based one- or two-compartment cell, either the cathodic or anodic compartment or both are absent, while the extraction compartment is present. An example of a suitable one-compartment electrochemical cell is illustrated in FIG. 2. The cations and/or anions are typically produced in the pores of the electrode. The membrane and electrode are preferably adjoined face-to-face with the membrane on the side in contact with the extraction compartment. Accordingly, it is preferred that the electrode and membrane both have a plate-like shape. Typically, the membrane and electrode are adjoined at a side surface of each, as opposed to at an edge. Preferably the electrode and the membrane are in contact, preferably in touching contact, with each other over at least 90% by area of a side of each, more preferably over 95% or more.

The electrode and the membrane are preferably stacked on each other to form a multilayer structure of generally parallel layers. One layer comprising or formed by the electrode and a next layer comprising or formed by the membrane. The MEA may be formed by clamping, (hot-)pressing, adhering and/or gluing, preferably by hot-pressing. Alternatively, the membrane may be formed on the electrode by casting or incorporating ion exchange particles into the top layer of the electrode that faces the inside of the electrochemical cell. Alternatively, the electrode may also be formed on the membrane.

The MEA may comprise one or more elements that attach the membrane and the electrode together, such elements may include clamps and/or adhesives. Another way of assuring good contact between the membrane and electrode is by applying a higher pressure in the electrochemical cell that presses the membrane onto the electrode.

The MEA can optionally comprise a thin layer at the interface of the membrane with the electrode, having a thickness of less than 0.1 mm, more preferably less than 50 μm, more preferably less than 1 μm. Such an optional layer may comprise the catholyte solution, the anolyte solution or the liquid.

The membranes and/or electrodes are typically arranged in a planar arrangement, such as in an essentially parallel plate arrangement. They may also be arranged in a concentric arrangement, such as in a circular configuration or in a spirally wound configuration. The electrode is typically in liquid contact with the corresponding membrane. The CEM is typically positioned between the anode and the AEM and the AEM is typically positioned between the cathode and the CEM.

Figure 3:
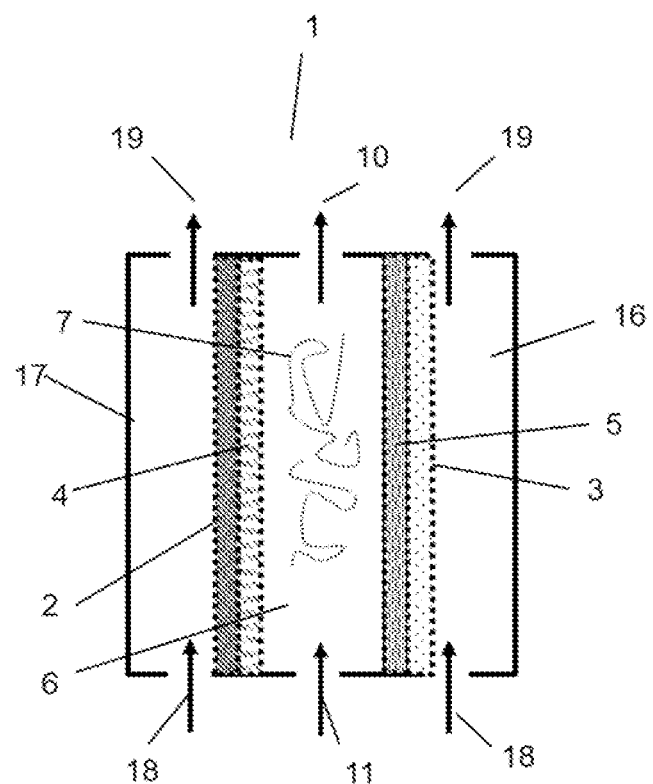
FIG. 3 illustrates an embodiment of a one-compartment electrochemical cell further comprising gas-compartments according to the present invention.

The extraction compartment of the electrochemical cell typically comprises a liquid. If other compartments are present, e.g. in the three- or two-compartment cells, these may individually be adapted to comprise a liquid or a gas. For instance, when the cell comprises one or more GDEs, the cathodic and/or anodic compartment may be gas-compartments. These gas-compartments are typically adjacent to the electrode on the gas stream side of the electrode. The gas-compartment may be employed to provide a gas stream (e.g. an oxygen-containing gas) to the electrode. Accordingly, it may be preferred for the gas-compartment to have an inlet and outlet for a gas stream to enter and exit the gas-compartment. FIG. 3 illustrates this preferred embodiment.

For an increased stability of the produced ions, it is preferred that the cations are produced at a pH of less than 7 and/or the anions are produced at a pH of more than 7. This is particularly favorable for the productions of $H_2O_2$ and formic acid. Accordingly, the anolyte solution typically has a pH of less than 7 such as less than 5 and/or the catholyte solution a pH of more than 7 such as more than 10. A particularly suitable acid to obtain an anolyte solution of a pH less than 7 is sulfuric acid. A base such as sodium hydroxide or potassium hydroxide, preferably sodium hydroxide, can be used to obtain a solution with a pH of more than 7. Thus, preferably the anolyte solution comprises an acid and/or the catholyte solution a base.

The extraction compartment is provided in the electrochemical cell, which is defined as the volume provided between the AEM and CEM. Preferably no electrodes are present in the extraction compartment. In the extraction compartment at least part of the anions and cations combine to form the product in the liquid. The liquid comprises the dissolved polyelectrolyte and may further comprise a solvent, preferably water. The water can for instance be supplied into the extraction compartment through the CEM and/or AEM by electro osmosis drag or can be supplied via an inlet for a liquid stream connected to the extraction compartment.

It is further preferred that the liquid in the extraction compartment has a pH below 8, preferably below 6, more preferably below 5. It is preferred for the pH to be below the pKa value of the product. This typically provides a protonated product, instead of e.g. a salt, that allows for easier separation. Additionally, it is preferred that the pH is sufficiently low to stabilize the product. For instance, for $H_2O_2$ (pKa of approximately 11.7), the pH of the liquid is preferably lower than 8, such as lower than 6, more preferably below 5, for example in the range of 3 to 7 or 4 to 5. Such a low pH typically minimizes decomposition. For the production of formic acid (pKa of approximately 3.75), it is preferred that the pH of the liquid is lower than 5, lower than 4 or lower than 3.

The dissolved polyelectrolyte may allow for the electrodes to be placed in closer proximity to one another, for instance to reduce the thickness of the extraction compartment to 1-2 mm. Reducing the distance reduces the ohmic resistance, which relates to a lower energy consumption.

Advantageously, the polyelectrolyte allows for a reduced pressure drop when the liquid flows through and having a dissolved polyelectrolyte is therefore advantageous for the scalability. The calculated pressure drop, as illustrated in Example 1, in a reactor of $0.5 m^2$ may be below 0.5 bar when a dissolved polyelectrolyte is used.

Typical criteria on which the polyelectrolyte is chosen include ionic conductivity, solubility, stability, ease of separation (i.a. molecular weight), toxicity and costs. The polyelectrolyte may be a neutral polymer such as a polyamine. The polyelectrolyte is ion-conductive and may accordingly comprise an anion exchange material, a cation exchange material, an amphoteric material and/or a combination thereof. Preferably the polyelectrolyte comprises a cation exchange material. When an anion exchange material and/or a cation exchange material is dissolved they typically comprise fixed charged groups with mobile counter ions.

In a preferred embodiment, the polyelectrolyte comprises a cation exchange material, e.g. an acidic polymer. An acidic polyelectrolyte, e.g. a polyelectrolyte having a pKa below 7, increases the stabilities of products such as $H_2O_2$ and carboxylic acids like formic acid. Preferably the polyelectrolyte has a pKa below 6, most preferably below 5 which allows for more dissociated protons in the liquid which lowers the pH and is associated with increased stability of the product.

In another preferred embodiment, the polyelectrolyte comprises a combination of cation exchange materials and anion exchange materials. Typically no specific pKa value is preferred for such a combination of materials. Additionally, no specific pKa value may be desired for a preferred embodiment wherein the polyelectrolyte comprises an amphoteric material.

A suitable polyelectrolyte may comprise a polycationic polymer, a polyanionic polymer or a zwitterionic polymer. More specifically, the polyelectrolyte preferably comprises a polyacrylic acid, a polyethyleneimine, a polyacrylamide, a polystyrene sulfonate, a poly(ethylenesulfonic acid), a polyallylamine, a carboxymethyl cellulose, a polygalacturonic acid, an alginic acid, a polypeptide, a polydiallyldimethylammonium, a chitosan, a polyphosphoric acid, a polymaleic acid, a poly(vinyl sulfonic acid), a polypyridinium, a poly(vinylphosphonic acid), a polyvinylamine, a sodium poly(acrylamide-2-methyl-1-propanesulfoate, a salt thereof, a derivative thereof, a copolymer thereof, and/or a combination thereof. Specific examples include poly(methacrylic acid), poly(4-vinyl-N-alkylpyridinium chloride), poly(sodium-4-styrenesulfonate), poly(acrylic acid-co-maleic acid), poly(allylamine hydrochloride), poly(diallyldimethyl ammonium chloride), sodium polyacrylate. Commercially available polyelectrolytes that may also be suitable include but are not limited to Duramax™, Tamol™, Romax™ and Dowex® from Dow Chemical, Acusol™ and Acumer™ from Rohm and Haas, Dispex® and Magnafloc® from BASF and Rheosiove™ and Terrablend™ from Arkema, Preferably, the polyelectrolyte comprises a polyanionic polymer, as these can be acidic at the right pH. Accordingly, the polyelectrolyte is preferably a polyacid, more preferably a polyacid selected from the group consisting of polyacrylic acids, polystyrene sulfonates, carboxymethyl celluloses, polygalacturonic acids, alginic acids, poly(ethylenesulfonic acids), polyphosphoric acids, polymaleic acids, poly(vinyl sulfonic acids), poly(vinylphosphonic acids), sodium poly(acrylamide-2-methyl-1-propanesulfoates), salts thereof, derivatives thereof, copolymers thereof, and combinations thereof.

The CEM that is used in the method according to the present invention is a selective cation-permeable membrane. Accordingly, at least a part of the produced cations is transported through the membrane into the extraction compartment. The CEM may comprise one or more polymers that comprise fixed anionic groups. This typically promotes selective permeability for cations and blocks the passage for anions.

Suitable materials for the CEM are polymers comprising groups such as $SO_3^-$, $COO^-$, $PO_3^-$, $HPO_3^-$, salts thereof and/or acids thereof. The CEM is preferably based on perfluorosulfonic acid, more preferably on perfluorosulfonic acid/polytetrafluoroethylene (PTFE) copolymers in acid form. Particularly suitable polymers comprise perfluorovinyl ether groups that are terminated with sulfonate groups and are incorporated onto a tetrafluoroethylene backbone. Examples thereof are the Nafion® membranes available from DuPont, such as N112, N115 and N117. Other suitable membranes include but are not limited to CM1, CM2, CMB, CMS, CMX and CMXSB available from Eurodia and/or Astom Corporation.

The AEM is a selective anion-permeable membrane that may block the passage of cations. Accordingly, at least part of the produced anions is transported through the membrane into the extraction compartment. The AEM typically comprises one or more polymers that comprise fixed cationic groups.

Suitable materials for the AEM are polymers that for instance comprise groups such as $RH_2N^+$, $R_2HN^+$, $R_3P^+$, $R_2S^+$. The groups may be covalently bound to the polymeric backbone. It is preferred that the AEM is sufficiently base resistant. Particularly suitable polymeric materials comprise a polyolefin backbone with tetraalkyl ammonium groups. Preferred membranes may include the Tokuyama Neosepta, AHA, ACM, ACS, AFX, AM1, AM3, AMX membranes available from Astom Corporation and/or Eurodia. Additionally, the FAA, FAB, FAD, FAS and FTAM membranes available from Fumatech are also suitable. Quaternary ammonium groups on cross-linked fluorinated polymers, such as Morgane® ADP membrane from Solvay or a perfluoro-AEM such as Tosflex® from Tosoh Co may also be suitable. The most preferred membrane is the AHA membrane in view of its chemical stability and selectivity.

The permselectivity of the AEM is preferably 0.9 or more, more preferably 0.95 or more, most preferably 0.98 or more. The permselectivity is a quantity that is used to describe the ability of a membrane to distinguish anions and cations. It may be determined from the percentage calculated from the concentration potential that is developed between solutions of the same electrolyte at different concentrations that are separated by the membrane as described by W. Grot, Fluorinated Ionomers (second edition), 2011. AEM with such selectivity are commercially available, for example the AHA membrane available from Eurodia and Astom. Furthermore, the AEM is for example less than 1 mm thick, or less than 0.5 mm and may for instance be provided with fiber reinforcement. The permselectivity is preferably sufficient to provide negligible permeation of cations through the AEM. Similarly, the permselectivity of the CEM may be sufficient to provide negligible permeation of anions.

The method may be carried out using a direct electric current (DC) at 100 A/m$^2$ or more, preferably 250 A/m$^2$ or more, more preferably 500 A/m$^2$ or more, typically less than 4000 A/m$^2$. The method may be carried out at a temperature between 5 and 150° C., such as between 10-90° C. and at ambient pressure or elevated pressures. Particularly good results are obtained at an ambient pressure, or for instance at a pressure in the range of 1.1 to 3 bar for $H_2O_2$ production. Elevated pressures such as up to 40 to 60 bar of $CO_2$ pressure may be suitable for the production of formic acid. The cations may be transported through the CEM by applying the field to the anode and cathode. The transport of the ions may involve diffusion, migration and surface site hopping.

Preferably the AEM and/or CEM are plate-shaped with a relatively small thickness compared to their length and width. They preferably have a plate-like shape that may be flat, curved, rolled or tubular.

The method may further comprise leading an extraction liquid stream out of the extraction compartment and separating the product from the polyelectrolyte to form a product stream comprising the product and a polyelectrolyte stream comprising the polyelectrolyte.

The separation is preferably done by filtration. This may for instance include filtration based on pressure difference (e.g. nanofiltration, ultrafiltration and microfiltration), concentration difference (e.g. dialysis), electric potential difference (e.g. electrodialysis) and/or temperature difference (e.g. membrane distillation). Preferably the filtration is based on pressure difference, more preferably nanofiltration and/or ultrafiltration is used, most preferably nanofiltration.

Filtration based on pressure is particularly suitable as the molecular weight of the polyelectrolyte is typically substantially higher than the product and/or solvent.

The molecular weight of the polyelectrolyte is typically sufficiently high for acceptable electrical conductivity, easy separation but sufficiently low for an acceptable viscosity. A suitable electrical conductivity is above 10 mS/cm such as above 15 mS/cm, or above 20 mS/cm. After separation, the product stream and the polyelectrolyte stream are obtained. The product stream can be processed in order to obtain the desired concentration or to isolate the product. The product may further be subjected to purification methods. The polyelectrolyte stream is preferably recycled back into the extraction compartment.

The viscosity of the liquid in the extraction compartment may also depend on the concentration of the polyelectrolyte in the liquid. For instance, the concentration may be between 0.1-60 wt % based on the liquid, or between 0.5-50 wt %, such as 2-45 wt %, or 3-35 wt %. In preferred embodiment, the concentration is less than 40 wt % or even less than 30 wt %. The concentration typically allows for sufficient electrical conductivity and sufficient fluidity. For each polyelectrolyte a specific combination of molecular weight and concentration may be chosen as a balance between functionality (i.a. electrical conductivity) and viscosity is typically required. The electrical conductivity of the liquid is preferably at least 10 mS/cm, more preferably at least 15 mS/cm, most preferably at least 20 mS/cm. Example 3 provides a theoretically calculated viscosity of the liquid that illustrates that for a preferred embodiment the viscosity is below 0.2 N*s/m$^2$ to maintain a pressure drop below 0.5 bar.

Figure 4A:
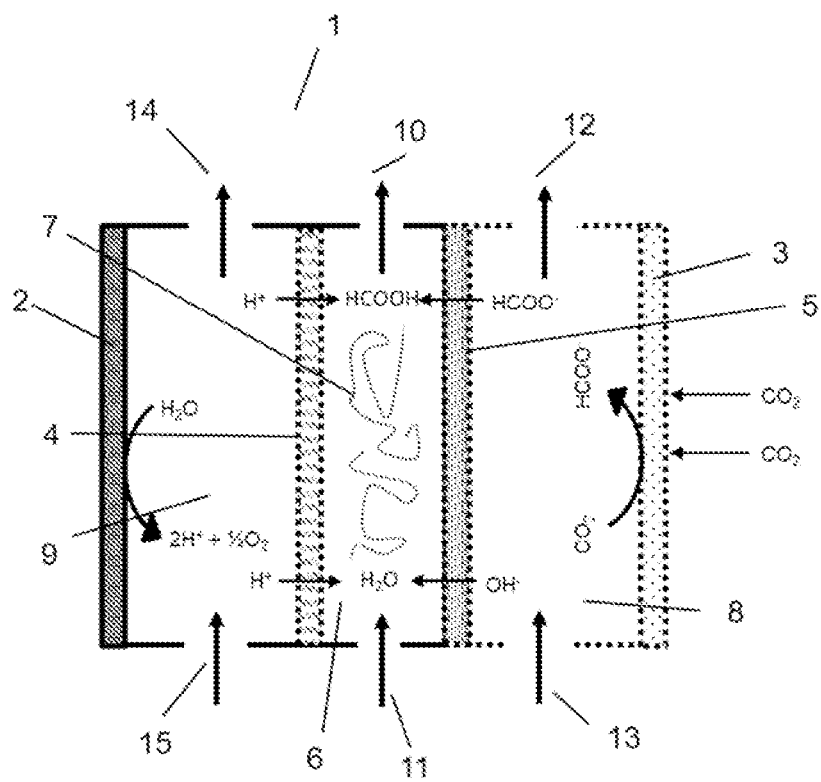
FIGS. 4a and 4b illustrate embodiments of the electrochemical cell according to the present invention wherein formic acid is formed.
Figure 4B:
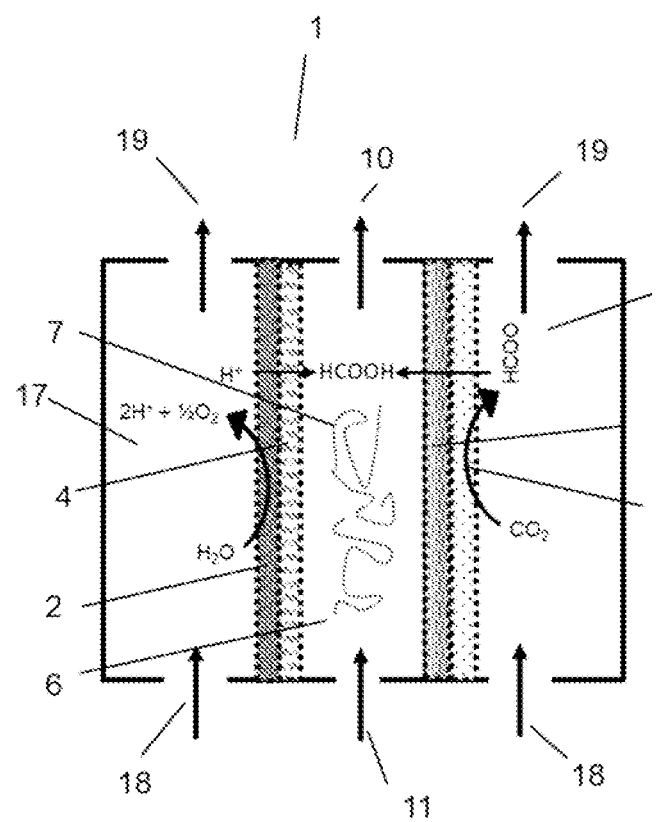
Figure 5A:
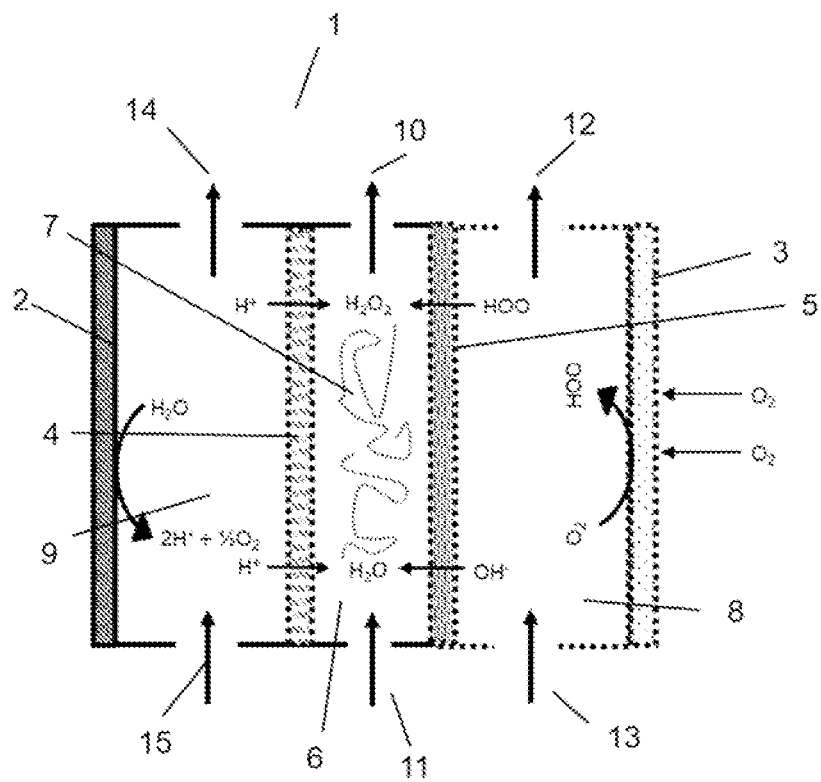
FIGS. 5a and 5b illustrate embodiments of the electrochemical cell according to the present invention wherein hydrogen peroxide is formed.
Figure 5B:
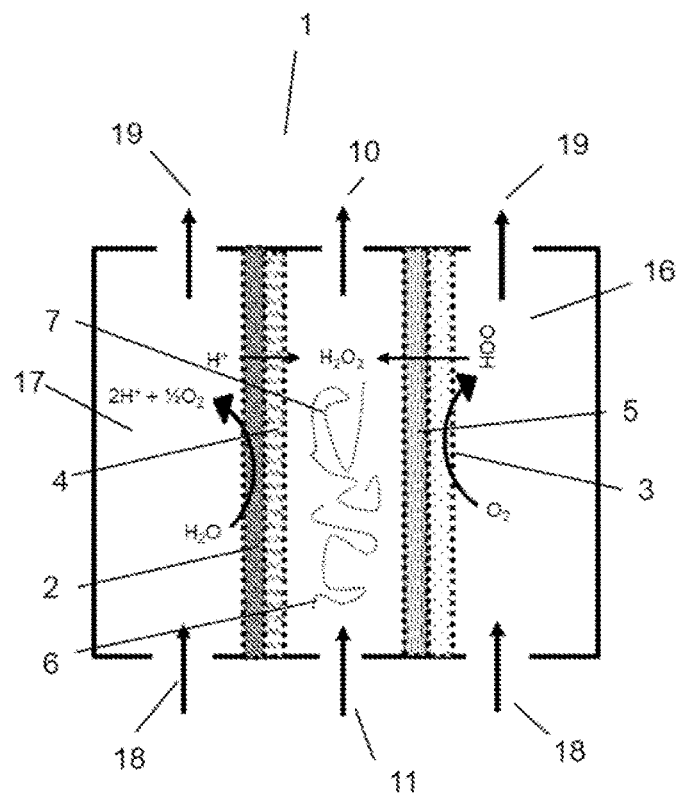
Figure 6:
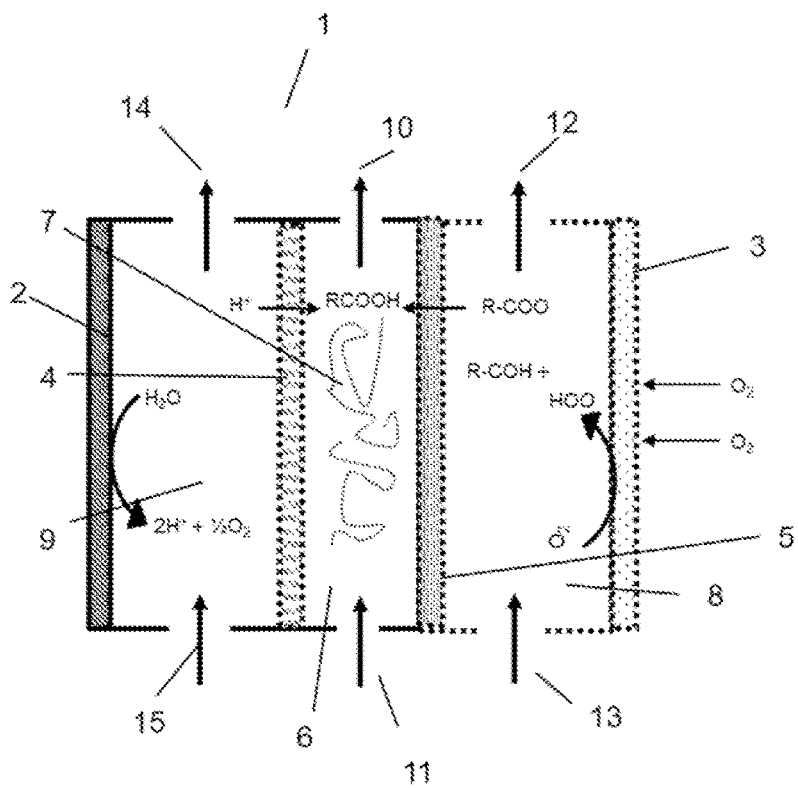
FIG. 6 illustrates an embodiment wherein an organic molecule is present in the catholyte solution.

In a preferred embodiment, as illustrated in FIGS. 4a-b and 5a-b, $HCO_2^-$ or $HO_2^-$ anions are produced by reducing respectively carbon dioxide or oxygen at the cathode. $C_2O_4^{2-}$ can moreover be formed by reducing carbon dioxide at the cathode. FIG. 4a and FIG. 5a illustrate a preferred embodiment for a three-compartment cell and FIG. 4b and FIG. 5b illustrate a preferred embodiment for a one-compartment cell. The cathode in the cell may be a gas diffusion electrode (GDE) that may further comprise a catalyst. The oxygen or carbon dioxide can be supplied gaseous and/or dissolved in a liquid or gas, for example an oxygen containing gaseous stream such as an air stream or oxygen gas, preferably oxygen is provided by an air stream. The formed peroxide anions may react with for instance an organic molecule that is present in the catholyte solution to from an ionic species, in particular to form an organic anion (such as a carboxylate e.g. glycolate anion). Such organic molecule may include an alcohol, such as an aromatic or aliphatic alcohol. An example hereof is illustrated in FIG. 6. The formed organic anion may then be transported through the AEM to form the product, such as a carboxylic acid (e.g. glycolic acid). Alternatively, no organic molecule is present in the catholyte solution and the formed anions such as $HCO_2^-$, $C_2O_4^{2-}$ are transported through the AEM to form the product such as formic acid or oxalic acid.

As further illustrated in FIGS. 4 and 5, water may be split at the anode to form protons and oxygen. Accordingly, the anode may be a porous electrode and the water may be supplied on the gas stream side (i.e. the side not in contact with the inside of the electrochemical cell) of the electrode. The cation thus preferably comprises a proton. The term 'proton' may refer to $H^+$ and/or its forms in aqueous solutions such as $H_3O^+$. At the cathode $HO_2^-$ anions are typically produced by reducing oxygen.

Alternatively, fuels such as hydrogen or alcohols (e.g. methanol) may be supplied at the anode. Preferably the oxidation potential of the fuel is positive. This typically decreases the amount of external electrical energy that is needed to operate the electrochemical cell. More preferably, the oxidation potential is sufficiently high to the extent that no external energy is required and the cell is self-sustained (i.a. the redox reaction is spontaneous). Moreover, a sufficiently high oxidation potential may allow for electrical energy to be derived from the cell (i.e. a fuel cell).

The cathode may be a GDE onto which the oxygen may be supplied by a gaseous stream. The protons can be transported through the CEM and the peroxide anions through the AEM into the extraction compartment. The ions may be combined in the extraction compartment to form hydrogen peroxide.

At the cathode water may also be formed. This can be limited by using a catalyst on the cathode. Particular good results have been obtained for a carbon-based catalyst. Accordingly, the cathode preferably comprises a catalyst, more preferably a carbon-based catalyst. Efficiency of the production of $HO_{2-}$ anions may reach up to 90% when using a carbon-based catalyst.

The invention further relates to an electrochemical cell for the method according the present invention. A preferred example of a suitable three-compartment electrochemical cell is illustrated in FIG. 1. The electrochemical cell (1) comprises an anode (2), a cathode (3), a cationic exchange membrane (4), an anionic exchange membrane (5) and an extraction compartment (6) comprising a polyelectrolyte (7). Wherein the anion exchange membrane (5) defines a cathodic compartment (8) with the cathode (3) and wherein the cation exchange membrane (4) defines an anodic compartment (9) with the anode (2). The extraction compartment (6) is provided between the cation exchange membrane (4) and the anion exchange membrane (5). The electrochemical cell further preferably comprises an outlet (10) and optionally an inlet (11) for a liquid stream that are connected to the extraction compartment (6). It is preferred that the outlet and optional inlet are not in contact with the membranes and/or electrodes. The outlet is typically used to extract the extraction stream from the extraction compartment. The inlet may be used for the recycled polyelectrolyte stream. It may further be used for providing additional liquid or solvent.

Additionally, FIG. 1 further illustrates the preferred embodiment wherein the electrochemical cell (1) further comprises an outlet (12) and an inlet (13) for a liquid stream that are connected to the cathodic compartment (8). It further illustrates the alternative or additional preference for the electrochemical cell to comprise an outlet (14) and inlet (15) for a liquid stream that are connected to the anodic compartment (9). The inlet and outlet may be used to provide additional catholyte and anolyte solution or may also be used to remove catholyte and anolyte solution. Additionally, the inlet may be used to introduce an organic molecule in the catholyte solution to from an ionic species with the produced anions.

FIG. 2 illustrates another preferred electrochemical cell (1) wherein the anion exchange membrane (5) is adjoined to the cathode (3) and wherein the cation exchange membrane (4) is adjoined to the anode (2), making an one-compartment cell. FIG. 2 further illustrates the preferred outlet (10) and optional inlet (11) for a liquid stream that are connected to the extraction compartment (6).

FIG. 3 illustrates the preference for one or two gas-compartments to be present. A first gas-compartment (16) may be connected to the cathode (3). A second gas-compartment (17) may alternatively or additionally be present that is connected to the anode (2). The gas-compartments preferably comprise an inlet (18) and outlet (19) for a gas stream. The gas-compartments are typically present in a one- or two-compartment cell. The gas provided in these compartments may provide reactants (e.g. oxygen) to the electrodes.

Additionally, a connection to a power supply may further be preferred for the electrochemical cell. A plurality of cells may also be used in a single reactor.

The invention can be illustrated with the following non-limiting examples.

EXAMPLE 1—PRESSURE DROP IN A REACTOR COMPRISING SOLID BEADS COMPARED TO A REACTOR COMPRISING A POLYELECTROLYTE

The pressure drop over the reactor comprising a middle compartment packed with solid beads (d=100 μm) is calculated. The calculation is based on reactor with a middle compartment of 2 mm thick and 500 mm wide (dimensions 1×0.5×0.002 m=0.5 m$^2$), assuming a solid phase fraction of 64% and a hydrogen peroxide production as presented in Table 1. The results show pressure drop of 1.5 to 9 bar for a flow of water through middle compartment with a flow rates of 25-50 L/h. For an industrial production of $H_2O_2$ electrode areas of even higher than 0.5 m$^2$ could be required (depending on production size), Table 1. Therefore, even higher pressure drop in a typical reactor could be obtained.

Instead of the solid beads, the dissolved polyelectrolyte according to the present invention is used. The results show that for a flow of polyelectrolyte solution with a viscosity even up to 100 times higher than of water, pressure drop in a reactor of a same dimensions without beads, for a the same flow rate of 25-50 L/h, is below 0.5 bar. This allows scale-up of the reactor to industrial scales 1-2.5 m$^2$.

TABLE 1

| $H_2O_2$ production rate and capacity | | | | |
|---|---|---|---|---|
| Current density | 1 | 1.5 | 2 | kA/m$^2$ |
| Faradaic Efficiency | 85 | 85 | 85 | % |
| $H_2O_2$ produced | 5.4 | 8.1 | 10.8 | kg/h * m$^2$ (10% $H_2O_2$) |
| Production capacity | 190 | 20 | 1 | ktonne/annum |
|  | 23750 | 2500 | 125 | kg/hr |
| Cell (electrode) area | 2.5 | 2.5 | 2.5 | m$^2$ |
| Cells required | 17620 | 1237 | 46 | cells |
| Cell (electrode) area | 1 | 1 | 1 | m$^2$ |
| Cells required | 44051 | 3091 | 116 | cells |

EXAMPLE 2—EFFECT OF THE CONCENTRATION OF A POLYELECTROLYTE ON THE PH AND IONIC CONDUCTIVITY AT ROOM TEMPERATURE IN AN AQUEOUS SOLUTION

The effect of the concentration of several polyelectrolytes dissolved in an aqueous solution on the ionic conductivity and pH at room temperature is investigated. FIGS. 7a-d illustrate the results, wherein the arrows are used to indicate the corresponding axis.

Figure 7A:
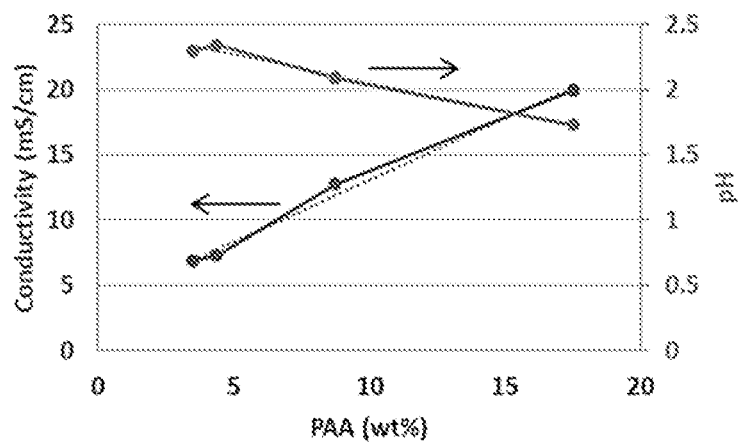
FIGS. 7a-7d illustrate the effect of the concentration of a polyelectrolyte in an aqueous solution on the ionic conductivity and pH.

FIG. 7a illustrates the effect for a polyacrylic acid with an average molecular weight of approximately 100,000 g/mol. The dotted line is a fitted function and the solid line represents the data. It demonstrates an increasing ionic conductivity and decreasing pH with increasing concentration. The concentration ranges from roughly 3 wt % to 18 wt % corresponding to a pH range from approximately 2.3 to 1.6 respectively and an ionic conductivity from approximately 6 to 20 mS/cm respectively.

Figure 7B:
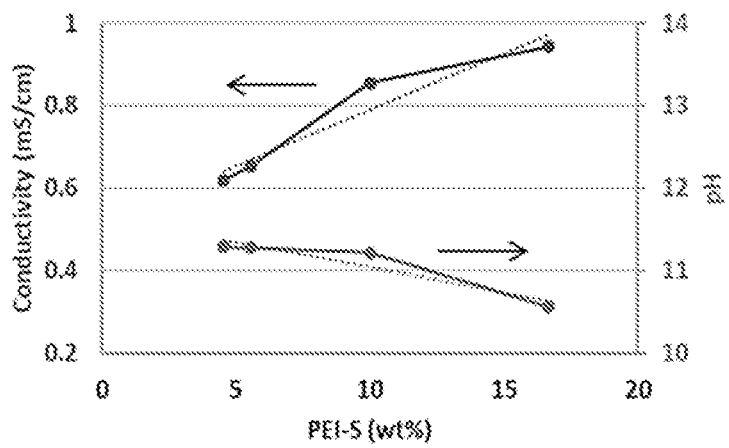

FIG. 7b illustrates the effect for a polyethyleneimine with an average molecular weight of approximately 2,000 g/mol. The dotted line is a fitted function and the solid line represents the data. It demonstrates an increasing ionic conductivity and decreasing pH with increasing concentration. The concentration ranges from roughly 4 wt % to 17 wt % corresponding to a pH range from approximately 11.3 to 10.5 respectively and an ionic conductivity from approximately 0.6 to 0.95 mS/cm respectively.

Figure 7C:
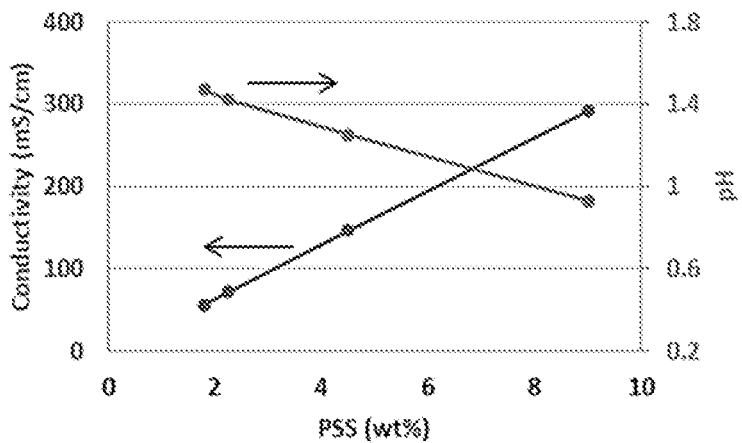

FIG. 7c illustrates the effect for a poly(4-styrenesulfonic acid) with an average molecular weight of approximately 75,000 g/mol. It demonstrates an steadily increasing ionic conductivity and steadily decreasing pH with increasing concentration. The concentration ranges from roughly 2 wt % to 9 wt % corresponding to a pH range from approximately 1.5 to 0.9 respectively and an ionic conductivity from approximately 50 to 300 mS/cm respectively.

Figure 7D:
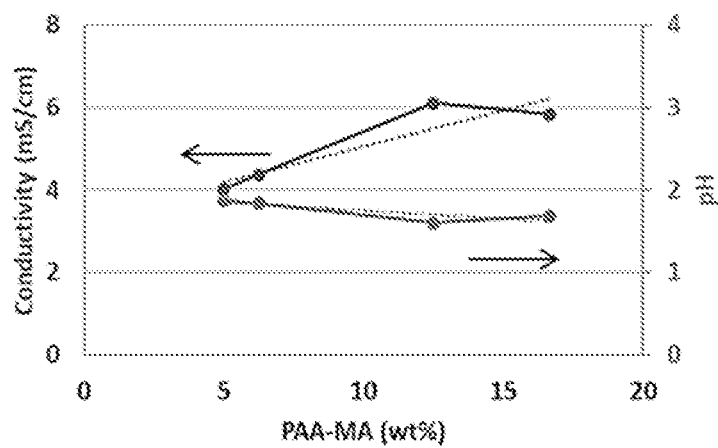

FIG. 7d illustrates the effect for a poly(acrylic acid-co-maleic acid) with an average molecular weight of approximately 3,000 g/mol. The dotted line is a fitted function and the solid line represents the data. It demonstrates an overall increasing ionic conductivity and an overall decreasing pH with increasing concentration. The concentration ranges from roughly 4 wt % to 17 wt % corresponding to a pH range from approximately 1.9 to 1.7 respectively and an ionic conductivity from approximately 4 to 5.9 mS/cm respectively. The ionic conductivity has a maximum of 6 S/cm at a concentration of approximately 12 wt %. At equal concentration the pH shows a minimum of roughly 1.6.

EXAMPLE 3—THEORETICAL VISCOSITY OF THE LIQUID COMPRISING A POLYELECTROLYTE

The viscosity of a liquid comprising a polyelectrolyte in a reactor comprising an extraction compartment is calculated. The calculation is based upon a reactor of geometric area of 0.5 m$^2$, with an extraction compartment of 0.2 cm thickness, with a polyelectrolyte with a density of 1100 kg/m$^3$. To maintain a pressure drop below 0.5 bar in the reactor at flowrates of 25-50 L/h, the viscosity cannot exceed 0.1-0.2 N*s/m$^2$.

EXAMPLE 4—$CO_2$ REDUCTION TO FORMIC ACID

A three-compartment electrochemical cell was charged as follows.
Anode: Pt plate 10 cm$^2$
Anolyte: 0.5 M $H_2SO_4$ (100 mL)
Cathode: Sn based GDE electrode 10 cm$^2$
Catholyte: 0.5 M $KHCO_3$ (100 mL)
Middle compartment: 50 gr of poly(sodium-4-styrenesulfonate) 70.000 MW (30% wt in $H_2O$) in 100 gr of water.

Then, $CO_2$ with a flow rate of 30 l/h was led through the cell. The applied voltage was −1.8 V vs Ag/AgCl. The chronoamperometry time was 5 hours.

The reaction was followed in time and the results are shown in FIGS. 8-11.

Figure 8:
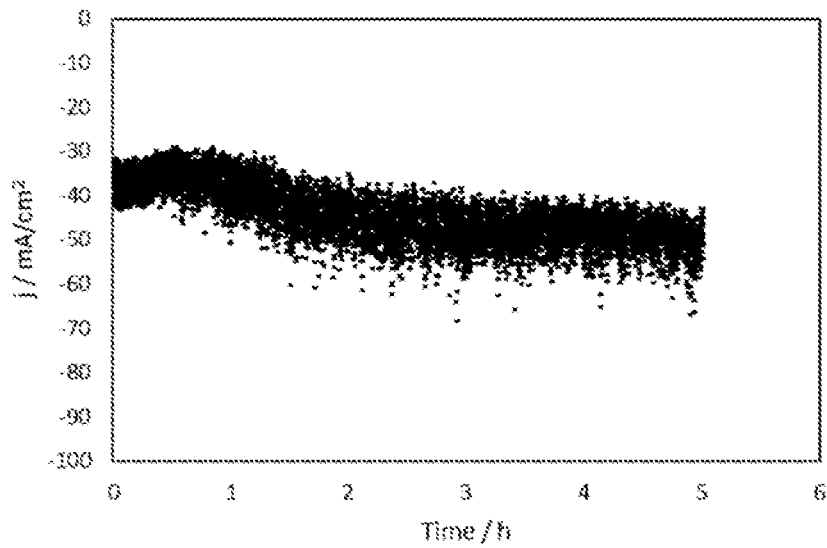
FIGS. 8-13 show results obtained from experiments as further detailed in the examples below.

FIG. 8 shows the chronoamperometry in time.

Figure 9:
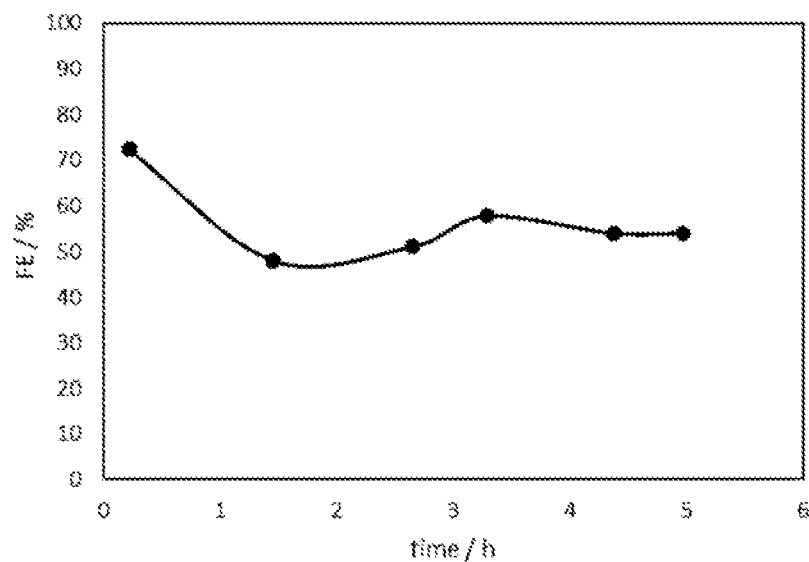

FIG. 9 shows the faradaic efficiency towards formic acid in time.

Figure 10:
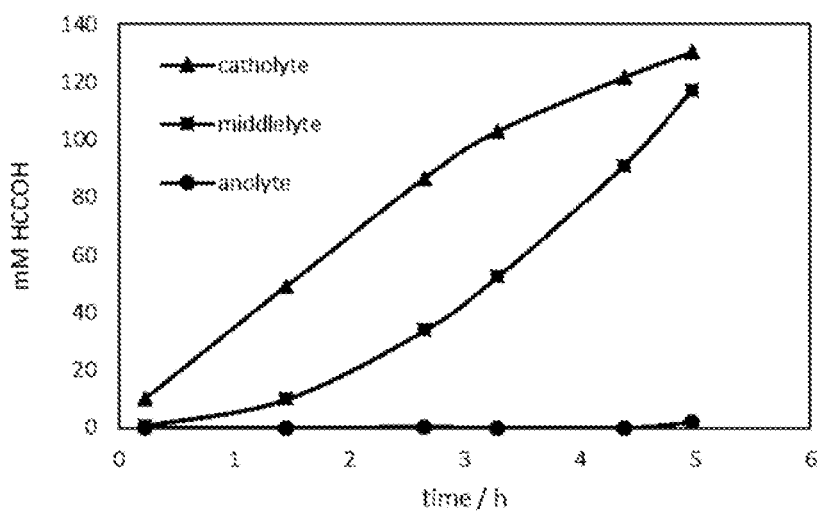

FIG. 10 shows the Concentration formate/formic acid per compartment in time.

Figure 11:
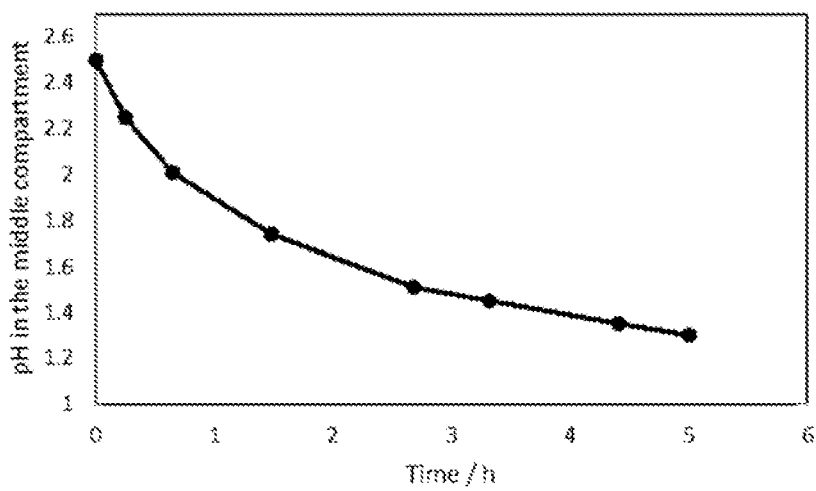

FIG. 11 shows the pH in the middle compartment in time.

EXAMPLE 5—$H_2O_2$ PRODUCTION

A three-compartment electrochemical cell was charged as follows.
Anode: Pt plate 10 cm$^2$
Anolyte: 0.4 M $H_2SO_4$ (100 mL)
Cathode: Sn based GDE electrode 10 cm$^2$
Catholyte: 0.2 M KOH (100 mL)
Middle compartment: 5 wt % aqueous polyacrylic acid (PAA) solution (Mw~75000).

Then, $O_2$ with a flow rate of 30 ml/min was led through the cell. The applied voltage was −0.5 V vs Ag/AgCl. The chronoamperometry time was 4 hours.

Figure 12:
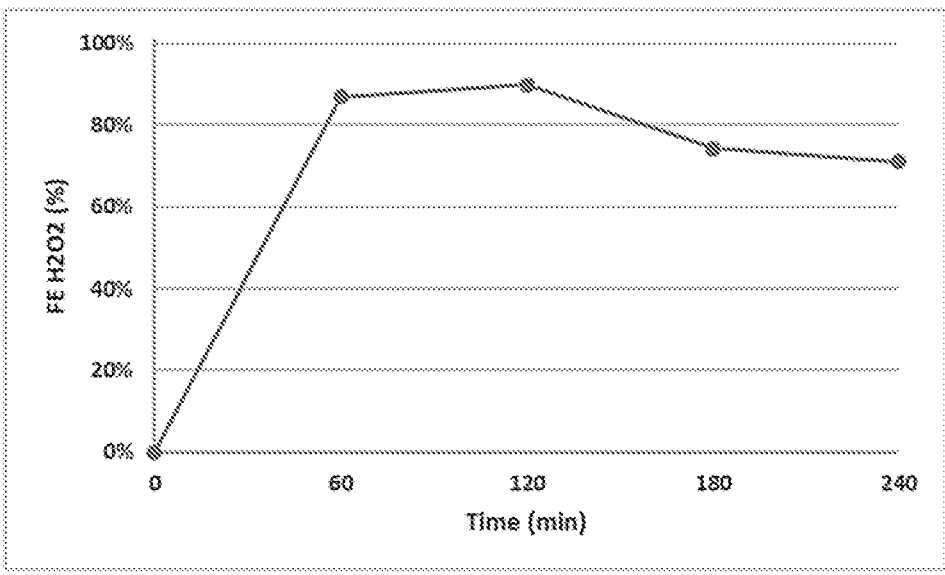
Figure 13:
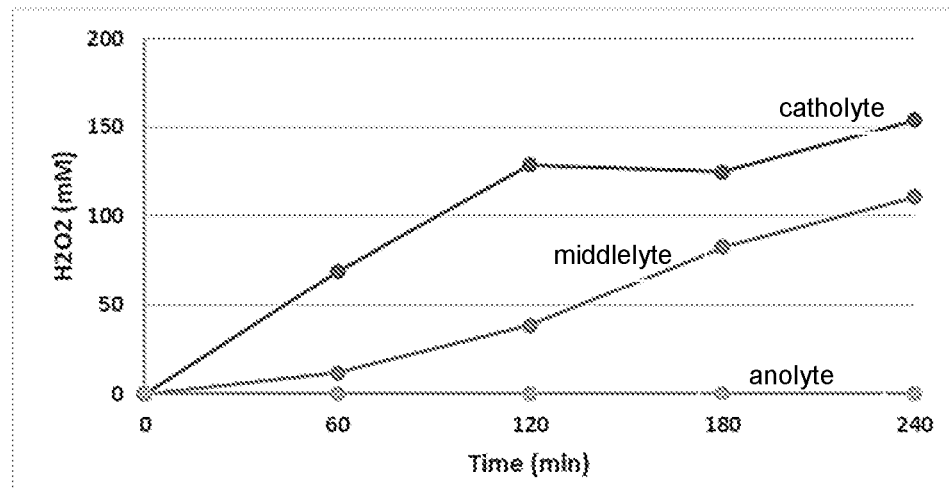

The reaction was followed in time and the results are shown in FIGS. 12-13.

FIG. 12 shows the overall Faradaic efficiency towards $H2O_2$ in time.

FIG. 13 shows the concentration $H_2O_2$ per compartment in time.

EXAMPLE 6—COMPARING CELL VOLTAGES

A three-compartment electrochemical cell was charged as follows.
Anode: Pt plate 10 cm$^2$
Anolyte: 0.4 M $H_2SO_4$ (100 mL)
Cathode: Sn based GDE electrode 10 cm$^2$
Catholyte: 0.2 M KOH (100 mL)
Middle compartment: 5 wt % aqueous polyacrylic acid (PAA) solution (Mw~75000) or 0.5M $K_2SO_4$.

During electrolysis in the 3-compartment cell, the cell voltages for 0.5M $K_2SO_4$ is compared to the cell voltage for 5 wt % PSS polyelectrolyte system in the middle compartment. For both contents of the middle compartment a cell voltage of ~4V was observed.

EXAMPLE 7

Viscosity measurements were performed with Ubblelohde Viscometer at room temperature. Following polyelectrolytes used:
Poly-acrylic acid (PAA)—10.000 MWCO
Poly-acrylic acid-Na (PAA-Na)—35.000 MWCO
Poly-sodium-4-styrenesulfonate (PSS)—75.000 MWCO

| Concentration (in the middle compartment) | Conductivity (mS/cm) | Viscosity (cSt) |
| --- | --- | --- |
| 0.5 M K2SO4 | 90 | 1.06 |
| 5 wt % PAA | 8.3 | 2.67 |
| 5 wt % PSS | 163 | 4.57 |
| 1 wt % PSS | 31 | 1.87 |
| 5 wt % PAA-Na | 20.3 | 2.41 |

EXAMPLE 8

Figure 14:
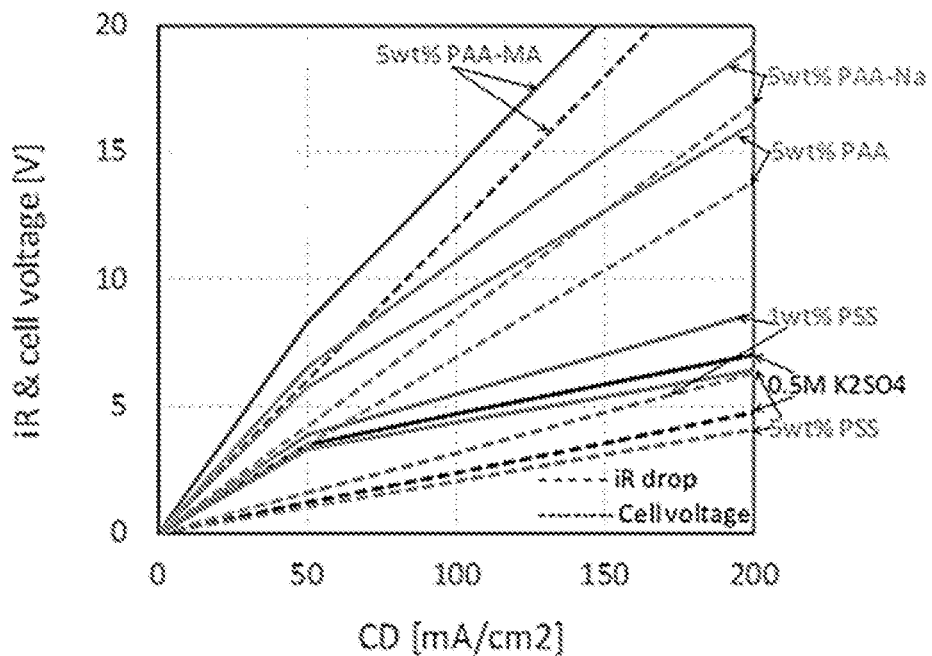
FIG. 14 shows ohmic losses (i.e. iR drop) and cell voltage as function of current densities in different electrolytes for various polyelectrolytes in an electrochemical reactor.
Figure 15:
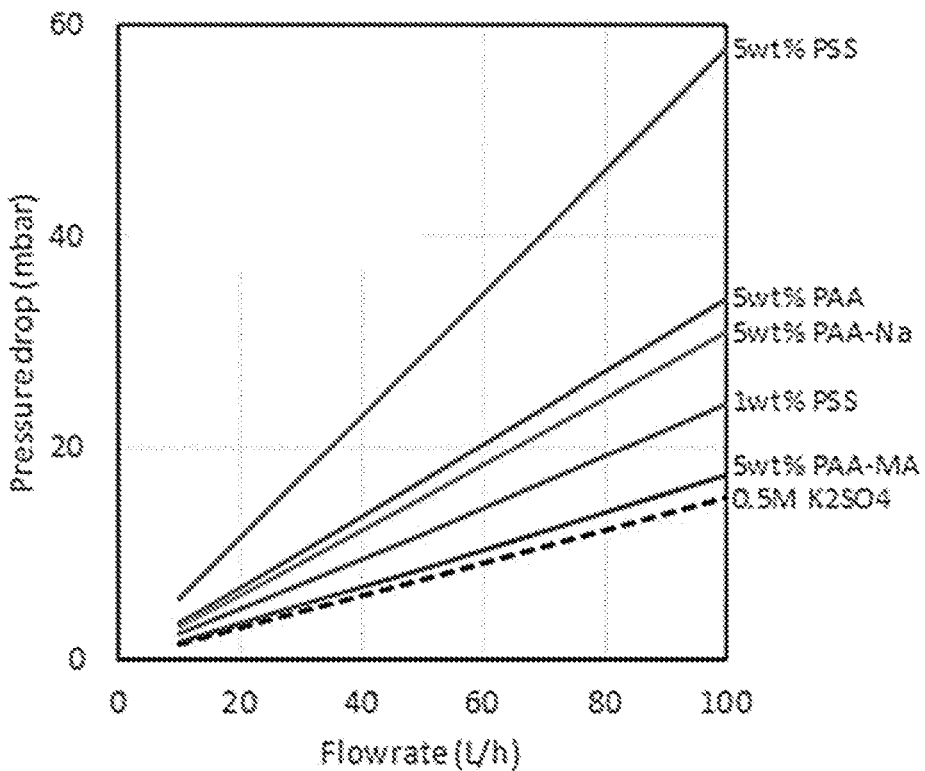
FIG. 15 shows the pressure drop of as a function of flowrates in various polyelectrolytes.

For the following polyelectrolytes ohmic losses and pressure drop were calculated for an electrochemical reactor:
1. Poly-acrylic acid (PAA)—10.000 MWCO
2. Poly-acrylic acid co-maleic acid (PAA-MA)—3.000 MWCO
3. Poly-acrylic acid-Na (PAA-Na)—35.000 MWCO
4. Poly-sodium-4-styrenesulfonate (PSS)—75.000 MWCO
5. Polyethyleneimine solution (PEI-S)—2.000 MWCO The ohmic losses (i.e. iR drop) were calculated based on the conductivity of the electrolytes (anolyte and catholyte compartment) and polyelectrolytes (middle compartment), for an electrochemical reactor with 3.5 mm anolyte and catholyte compartment thickness, and 3 mm of middle compartment thickness (0.2M KOH as catholyte and 0.4M $H_2SO_4$ as anolyte). The results show that PSS could most suitable in terms of energy consumption as it results in almost the same cell voltage as 0.5M $K_2SO_4$, a benchmark electrolyte; and similar pressure drops as aqueous 0.5 $K_2SO_4$. Pressure drop was calculated using Ergun equation, and same dimensions of the reactor as in example 1. The results are shown in FIG. 14 (iR-drop and cell voltage as function of current densities in different electrolytes) and 15 (pressure drop as a function of flowrates in different electrolytes).

The invention claimed is:

1. A method for electrochemical production of a product in an electrochemical cell comprising:
producing cations at an anode;
producing anions at a cathode;
transporting said cations through a cation exchange membrane (CEM) into an extraction compartment of said electrochemical cell;
transporting said anions through an anion exchange membrane (AEM) into said extraction compartment;
reacting at least part of said anions and cations in said extraction compartment to form said product;
wherein said extraction compartment is provided between said CEM and AEM and comprises a liquid comprising a dissolved polyelectrolyte, wherein said polyelectrolyte comprises a polycationic polymer, a polyanionic polymer, and/or a zwitterionic polymer; and wherein said dissolved polyelectrolyte does not substantially cross the membranes.

2. The method according to claim 1, further comprising leading an extraction liquid stream out of said extraction compartment and separating said product from said polyelectrolyte, to form a product stream comprising said product and a polyelectrolyte stream comprising said polyelectrolyte.

3. The method according to claim 1, wherein said polyelectrolyte stream is recycled into the extraction compartment.

4. The method according to claim 1 wherein said polyelectrolyte comprises a cation exchange material, an anion exchange material, an amphoteric material and/or a combination thereof.

5. The method according to claim 1 wherein said polyelectrolyte comprises an cationic exchange material having a pKa below 7.

6. The method according to claim 1 wherein said polyelectrolyte comprises a polyacrylic acid, a polyethyleneimine, a polyacrylamide, a polystyrene sulfonate, a polyallylamine, a carboxymethyl cellulose, a polygalacturonic acid, an alginic acid, a polypeptide, a poly(ethylenesulfonic acid), a polydiallyldimethylammonium, a chitosan, a polyphosphoric acid, a polymaleic acid, a poly(vinyl sulfonic acid), a polypyridinium, a poly(vinylphosphonic acid), a polyvinylamine, a sodium poly(acrylamide-2-methyl-1-propanesulfoate), a salt thereof, a copolymer thereof, and/or a combination thereof.

7. The method according to claim 1 wherein the electrical conductivity of said liquid comprising said polyelectrolyte is at least 10 mS/cm.

8. The method according to claim 1 wherein the polyelectrolyte is present in an amount of between 0.1-60 wt % based on the liquid.

9. The method according to claim 1 wherein said liquid comprising said polyelectrolyte has a pH below 8.

10. The method according to claim 1 wherein said cation comprises a proton.

11. The method according to claim 1, wherein said electrochemical cell is a three-compartment electrochemical cell or an electrochemical cell comprising a membrane-electrode assembly (MEA).

12. The method according to claim 1, wherein the product comprises hydrogen peroxide ($H_2O_2$), a carboxylic acid, and/or a salt thereof.

13. The method according to claim 1 wherein said cathode comprises a catalyst.

14. The method according to claim 1 wherein the electrical conductivity of said liquid comprising said polyelectrolyte is at least 20 mS/cm.

15. The method according to claim 1 wherein the polyelectrolyte is present in an amount between 3-35 wt %.

16. The method according to claim 1 wherein said liquid comprising said polyelectrolyte has a pH below 5.

17. The method according to claim 1 wherein said cathode comprises a catalyst that comprises a metal, a metal alloy, a metal oxide, a mixed metal oxide, a metal complex, a carbon-based catalyst such as carbon-plates, RVC, carbon particles and/or carbon cloth which are optionally doped, an organic compound and/or a combination thereof.

* * * * *